(12) United States Patent
Coteus et al.

(10) Patent No.: US 9,037,892 B2
(45) Date of Patent: May 19, 2015

(54) SYSTEM-WIDE POWER MANAGEMENT CONTROL VIA CLOCK DISTRIBUTION NETWORK

(75) Inventors: Paul W. Coteus, Yorktown Heights, NY (US); Alan Gara, Mount Kisco, NY (US); Thomas M. Gooding, Rochester, MN (US); Rudolf A. Haring, Cortlandt Manor, NY (US); Gerard V. Kopcsay, Yorktown Heights, NY (US); Thomas A. Liebsch, Arlington, SD (US); Don D. Reed, Mantorville, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1071 days.

(21) Appl. No.: 13/085,879

(22) Filed: Apr. 13, 2011

(65) Prior Publication Data
US 2012/0266008 A1 Oct. 18, 2012

(51) Int. Cl.
*G06F 1/04* (2006.01)
*G06F 1/12* (2006.01)
*G06F 1/32* (2006.01)
*G06F 1/10* (2006.01)
*G06F 1/20* (2006.01)

(52) U.S. Cl.
CPC ........ *G06F 1/329* (2013.01); *G06F 1/10* (2013.01); *G06F 1/12* (2013.01); *G06F 1/206* (2013.01); *G06F 1/3206* (2013.01); *G06F 1/324* (2013.01); *G06F 1/3296* (2013.01)

(58) Field of Classification Search
CPC ............... G06F 1/04; G06F 1/10; G06F 1/12; G06F 1/3203; G06F 1/3296; H04L 27/2626
USPC ................. 713/300, 320, 375, 400, 500
See application file for complete search history.

(56) References Cited

U.S. PATENT DOCUMENTS

| 5,724,591 | A | 3/1998 | Hara et al. |
| 5,787,294 | A | 7/1998 | Evoy |
| 5,805,871 | A * | 9/1998 | Baxter .......................... 713/500 |
| 7,017,061 | B2 | 3/2006 | Lippert et al. |
| 7,337,339 | B1 | 2/2008 | Choquette et al. |
| 7,536,597 | B2 * | 5/2009 | McGowan ....................... 714/30 |
| 7,613,935 | B2 | 11/2009 | Schumacher et al. |

(Continued)

OTHER PUBLICATIONS

Watanabe, R. et al., "Power Reduction of Chip Multi-Processors Using Shared Resource Control Cooperating with DVFS" Research Center for Advanced Science and Technology, The University of Tokyo, IEEE Xplore (2007) pp. 615-622.

(Continued)

*Primary Examiner* — Kim Huynh
*Assistant Examiner* — Brandon Kinsey
(74) *Attorney, Agent, or Firm* — Scully, SCott, Murphy & Presser, P.C.; Daniel P. Morris, Esq.

(57) ABSTRACT

An apparatus, method and computer program product for automatically controlling power dissipation of a parallel computing system that includes a plurality of processors. A computing device issues a command to the parallel computing system. A clock pulse-width modulator encodes the command in a system clock signal to be distributed to the plurality of processors. The plurality of processors in the parallel computing system receive the system clock signal including the encoded command, and adjusts power dissipation according to the encoded command.

27 Claims, 4 Drawing Sheets

(56) References Cited

U.S. PATENT DOCUMENTS

| | | | |
|---|---|---|---|
| 7,664,973 | B2 | 2/2010 | Kiyozaki |
| 2002/0136296 | A1* | 9/2002 | Stone et al. ............... 375/240.03 |
| 2004/0156398 | A1* | 8/2004 | Abel et al. .................... 370/516 |
| 2005/0193095 | A1* | 9/2005 | Driediger et al. ............. 709/219 |
| 2006/0161794 | A1 | 7/2006 | Chiasson et al. |
| 2007/0168055 | A1 | 7/2007 | Hsu et al. |
| 2008/0028249 | A1 | 1/2008 | Agrawal |
| 2009/0006873 | A1 | 1/2009 | Bellofatto et al. |
| 2009/0150693 | A1 | 6/2009 | Kashyap et al. |
| 2010/0037038 | A1 | 2/2010 | Bieswanger et al. |
| 2010/0199280 | A1* | 8/2010 | Vestal et al. .................. 718/102 |
| 2012/0054503 | A1* | 3/2012 | Hsiao et al. ................... 713/300 |

OTHER PUBLICATIONS

Von Laszewski, G. et al., "Power-Aware Scheduling of Virtual Machines in DVFS-enabled Clusters" Service Oriented Cyberinfrastructure Labe, Rochester Institute of Technology, IEEE Xplore (2009) pp. 1-10.

Springer, R. et al., "Minimizing Execution Time in MPI Programs on an Energy-Constrained, Power-Scalable Cluster" Department of Computer Science, The University of Georgia and North Carolina State University (2006) pp. 230-238.

"Dynamic Frequency & Voltage Scaling Settings by Battery Level" IP.com No. IPCOM000181101D (Mar. 26, 2009) http://www.ip.com/pubview/IPCOM000181101D.

Ji, R. et al., "The Implementation and Design of a Low-Power Clock Distribution Microarchitecture" International Conference on Networking, Architecture, and Storage, IEEE Computer Society (2007).

U.S. Appl. No. 12/696,764, filed Jan. 29, 2010 entitled, "Global Synchronization of Parallel Processors Using Clock Pulse Width Modulation", first named inventor: Dong Chen.

* cited by examiner

SYSTEM-WIDE POWER MANAGEMENT CONTROL VIA CLOCK DISTRIBUTION NETWORK

STATEMENT OF GOVERNMENT RIGHTS

This invention was made with Government support under Contract No. B554331 awarded by the Department of Energy. The Government has certain rights in the invention.

BACKGROUND

The present application generally relates to automatic power management in a parallel computing system that includes a plurality of processors. More particularly, the present application relates to automatically controlling power dissipation of a parallel computing system via commands generated from a host computing device.

Certain computing systems and super computing systems, for example BLUE GENE® (registered trademark of International Business Machines, Incorporated), have a single global clock signal, also known as a system clock signal, that controls all processors in the systems. Such a single system clock signal simplifies processor-to-processor communication circuitry. However, the simplified processor-to-processor communication circuitry leads to an additional requirement: if the frequencies of the processor-to-processor communication circuitry are changed, then the frequency change needs to be carefully orchestrated across all processors in these systems, to maintain processor-to-processor communication integrity.

Typical power saving mechanisms developed for computing systems only act locally, in the sense that they only affect individual processors in the computing system and are based on local temperature or workload conditions. Such mechanisms do not generally take into account global parameters (e.g., temperature, time varying electricity cost, etc.) of a room or data center where the computing system is operated. A parallel computing system (e.g., IBM® BLUE GENE®, Cray® XE™ supercomputers, etc.), however, includes up to thousands of processors (e.g., IBM® PowerPC®, Intel® Core™, etc.). These thousands of processors in the parallel computing system consume so much energy (e.g., 30 to 100 kW power consumption per one thousand operating processors in the parallel computing system) that developers of the parallel computing system need to consider the global parameters and limitations of the room or data center.

The active or switching power dissipated by an electronic circuit (e.g., a processor, memory device, etc.) can be described as $P=\frac{1}{2} \times C \times V_{dd}^2 \times f \times a$, where P is the power dissipation of the electronic circuit, C is a capacitance being switched in the electronic circuit, $V_{dd}$ is a power supply voltage to the electronic circuit, f is a clock frequency (e.g. of the fastest clock on the chip, e.g., a processor clock) of the electronic circuit, and "a" is a switching activity factor of the electronic circuit, which is the fraction of clock cycles at frequency "f" that the circuit is actually active and switching. For the total switching power dissipation of a processor, the contribution of each sub-circuit has to be summed. For the total switching power dissipation of a parallel computing system, the contribution of each processor has to be summed, along with the contributions of non-processor chips (e.g., memory devices, interconnects, etc.).

SUMMARY OF THE INVENTION

The present disclosure describes a system, method and computer program product for automatically controlling power dissipation in a parallel computing system that includes a plurality of processors.

In one embodiment, there is provided an apparatus for automatically controlling power dissipation in a parallel computing system that includes a plurality of processors. A computing device issues a command to the parallel computing system. A clock pulse-width modulator encodes the command in a system clock signal to be distributed to the plurality of processors. The plurality of processors in the parallel computing system receives the system clock signal including the encoded command, and adjusts power dissipation according to the encoded command.

In a further embodiment, the clock pulse-width modulator encodes the command in the system clock signal by using a pulse width modulation.

In a further embodiment, the command includes a periodic global synchronization signal for synchronizing the one or more of the plurality of processors.

In a further embodiment, the command initiates a power management action of the parallel computing system.

In a further embodiment, in response to the encoded command, the one or more of the plurality of processors adjust power dissipation by using one or more of: clock gating, dynamic frequency scaling (DFS), dynamic voltage scaling (DVS), and performance adjustment.

In a further embodiment, the one or more of the plurality of processors synchronously respond to the encoded command.

In a further embodiment, the computing device issues the command in response to data from sensors internal to the parallel computing system.

In a further embodiment, the computing device issues the command in response to data from sensors external to the parallel computing system.

In a further embodiment, the computing device issues the command in response to data center policies.

In a further embodiment, the computing device issues the command in response to time varying cost of electricity and cooling of the parallel computing system.

In a further embodiment, each partition of the parallel computing system reacts differently in response to the encoded command.

BRIEF DESCRIPTION OF THE DRAWINGS

The accompanying drawings are included to provide a further understanding of the present invention, and are incorporated in and constitute a part of this specification.

DETAILED DESCRIPTION

Some of the factors in the above power equation (i.e., $P=\frac{1}{2} \times C \times V_{dd}^2 \times f \times a$) are fixed for any given system, while running a particular workload of computer programs in a computing system. For example, given a particular semiconductor chip (e.g., processor, memory device, etc.), the capacitance "C" of any particular sub-circuit is fixed by the design of the semiconductor chip and its circuits, and therefore offers no opportunity for an external control of the capacitance "C." In one embodiment, the present disclosure describes manipulating the remaining factors (e.g., "f": frequency, "a": switching factor, "$V_{dd}$": power supply voltage) in a parallel computing system that includes a plurality of processors.

The switching activity "a" has several components:

Some circuits are always operational, e.g., some operating components of the on-chip clock distribution logic are always turned on. The power dissipated by these circuits contributes to the "idle" power of a processor, i.e. the power that is dissipated even if the processor does no work.

For other circuits (e.g., ALU, etc.), the switching activity is determined in part by instructions and data flowing through the processor, and is thus dependent on actual programs being run. Switching factors for these circuits (e.g., ALU, etc.) can vary cycle-by-cycle.

The switching activity on the processor may be reduced by employing various techniques:

Local circuit-level techniques for reducing the switching activity of non-active circuits include, but are not limited to: clock gating (i.e., disabling a portion of circuitry to reduce power dissipation of the circuitry), which can operate locally on each circuit (e.g., flip-flop, etc.) on a cycle-by cycle basis.

Figure 1:
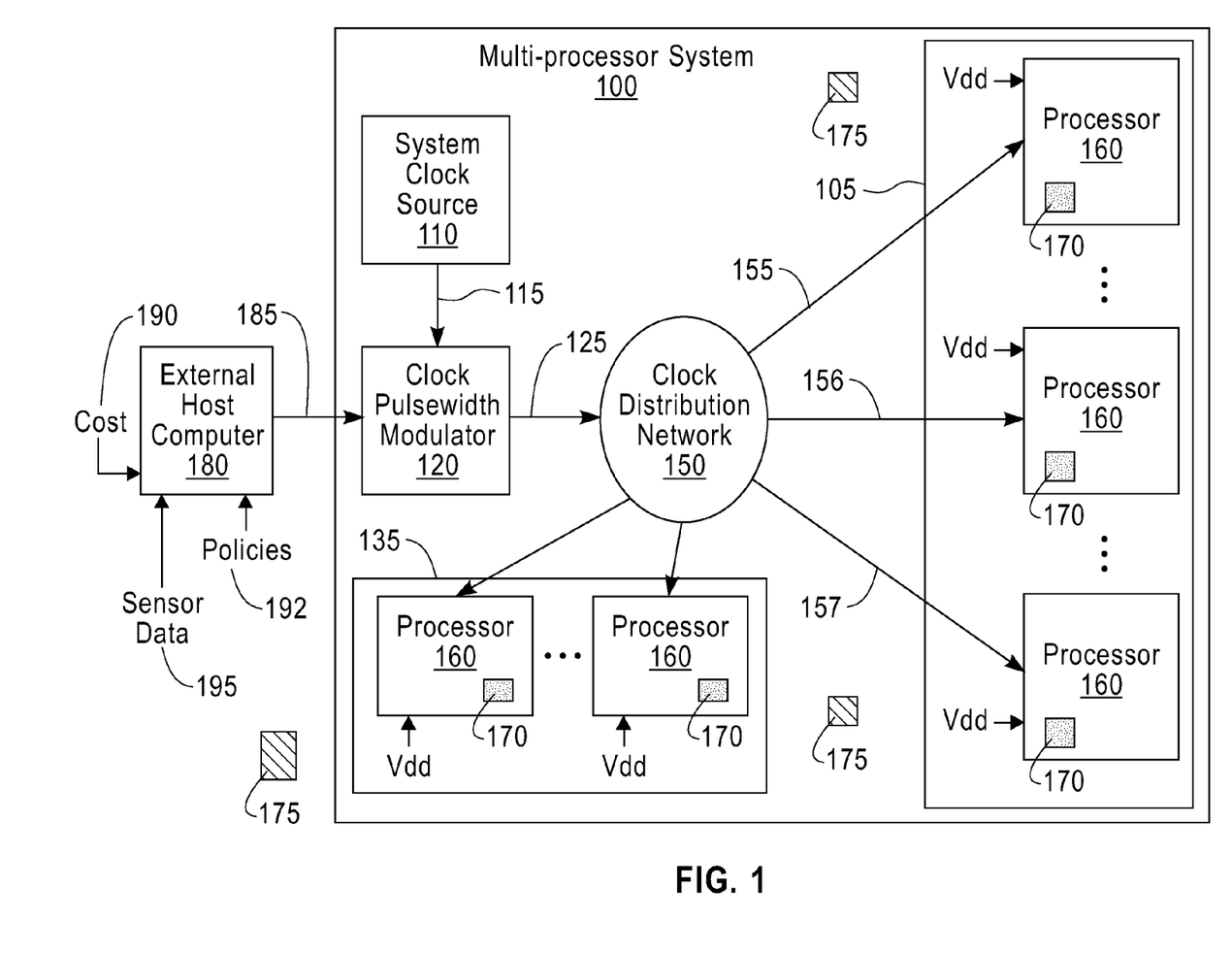
FIG. 1 is a system diagram for controlling power dissipation in a parallel computing system that includes a plurality of processors in one embodiment.

The switching activity can be influenced externally, e.g., by performance tuning or de-tuning in response to external commands. In one embodiment, as shown in FIG. 1, an external computing device (e.g., a host computer device 180 in FIG. 1) sends a command, e.g., as a binary data stream via a wireless or wired transmission medium 185, to a parallel computing system (e.g., multi-processor system 100 in FIG. 1) to change performance characteristics to all processors in a user partition. For example, the command may instruct the processors in a parallel computing system to change memory access parameters, to decrease performance and thus reduce the switching activity of these processors. Another example for reducing the switching activity of these processors may be a mechanism that, in response to external commands, dynamically insert idles (no-ops) into an instruction stream of these processors. These exemplary techniques (e.g., techniques influencing the switching activity in response to external commands) trade off power consumption and performance.

System-wide techniques for reducing the switching activity may consider deferring the running of high-power-consumption programs temporarily, from a period of high power and cooling cost to a lower-cost period, etc.

The DVS technique refers to a power controlling mechanism in which the output voltage of a power supply to an electric module is increased to boost performance of the module or decreased to conserve power dissipation of the module. The Dynamic Voltage Scaling (DVS) technique enables the control of power supply voltage $V_{dd}$ for one or more processors in a parallel computing system.

The DFS technique refers to a technique by which a clock frequency of a processor, or sub-circuits thereof, is changed to reduce power consumption of the processor or to increase throughput of the processor. The Dynamic Frequency Scaling (DFS) technique enables the control of a clock frequency "f" of all or part of the circuitry for one or more processors in the parallel computing system.

Note that the clock frequency "f" and the power supply "$V_{dd}$" are not independent. For example, $V_{dd}$ needs to be maintained at a minimum level, with some margin, to guarantee proper operation at the frequency "f". Thus, if, for power management reasons, both "$V_{dd}$" and "f" need to be reduced dynamically, then frequency "f" may be reduced first, optionally followed by the power supply "$V_{dd}$" reduction. Conversely, when increasing these, the power supply "$V_{dd}$" may need to be increased first, before the frequency "f" can be increased.

In one embodiment, in employing DFS technique and/or DVS technique, the decisions to use either or both of these DFS and DVS techniques may be made locally, e.g., at the level of individual processors. However, in a parallel computing system, processors in a (sub-) group, known as a user partition, will run a similar workload at the same time, as an application to be run in the (sub-) group is distributed evenly across the processors in the (sub-) group. The processors in the (sub-) groups are tightly interconnected by a processor-to-processor communication network, for the purpose of rapid data exchange between the processors. In such tightly interconnected systems, the application performance may be determined by the slowest processor. Thus, if an external command slows down one processor in a (sub-) group in a parallel computing system, e.g., by using DFS and/or DVS techniques, then additionally slowing down all the other processors in concert may have no additional performance impact, but may multiply the power savings in the (sub-) group. In one embodiment, as shown in FIG. 1, a host computing device (e.g., a host computer device 180 in FIG. 1) sends a command, e.g., as a binary data stream via a wireless or wired transmission medium 185, to a parallel computing system (e.g., multi-processor system 100 in FIG. 1) to apply the DFS and/or DVS technique to all processors in a user partition (e.g., user partition 105 or 135 in FIG. 1) at the same time, to conserve power consumption in the user partition.

In one embodiment, a host computing device (e.g., an external computer 180 in FIG. 1) issues a command(s) to a computer system or plurality of computers or processors in a synchronized fashion, such that processors in a sub-partition or in the whole system, can take coordinated action (e.g., react in a same manner at the same time) to control power dissipation of these processors, e.g., by affecting the switching activity "a" or frequency "f" of those processors. The host computing device may subsequently and optionally then issue a further command to cause power supply controllers of those processors to reduce "$V_{dd}$" in order to further reduce power dissipation of those processors.

In one embodiment, the host computing device issues at least one command to a computer system, or plurality of computers or processors, in a synchronized fashion. There is provided a serial communication channel in the computer system or plurality of computers or processors for broadcasting the commands for receipt by each of the plurality of computers or processors, where the command(s) is (are) encoded onto a global (system) clock signal, e.g., by using pulse width modulation of the system clock signal. Upon receipt of the command encoded in the system clock signal, the processors, e.g., in a sub-partition or in the whole system, take synchronized and coordinated action between the processors, for example on-chip clock frequency reduction to reduce power dissipation in those processors. In this way, deterministic timing (i.e., synchronized) relationships between the processors are maintained, as may be required for maintaining the integrity of processor-to-processor communication.

Figure 3:
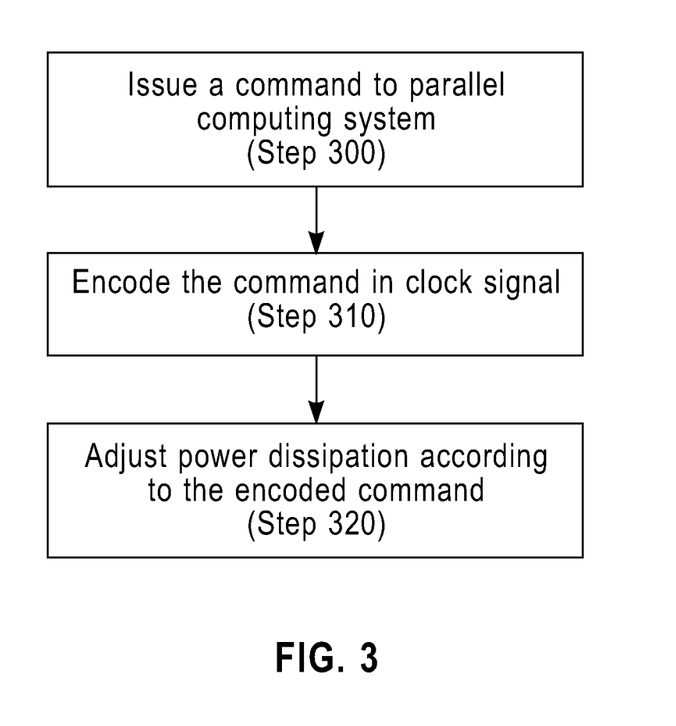
FIG. 3 is a flow chart describing method steps for controlling power dissipation in a parallel computing system in one embodiment.

FIG. 1 is a system diagram for controlling power dissipation in a parallel computing system 100 that includes a plurality of processors 160 in one embodiment. FIG. 3 is a flow chart that describes the operation of the system diagram in one embodiment. At step 300 in FIG. 3, the host computing device 180 (e.g., a laptop computer, a desktop computer, a workstation, a server device, a client device, a smart phone, a tablet computer, etc.) issues at least one command (e.g., binary data to instruct the parallel computing system to reduce power supply voltage) to the parallel computing system 100 via a communication link 185 (e.g., a wired network, a wireless network, etc.) between the host computing device 180 and the parallel computing system 100.

At step 310 in FIG. 3, upon receiving the command from the host computing device 180, a clock pulse-width modulator 120 in the parallel computing system 100 encodes the command into a system clock signal generated from a system clock source 110 (e.g., a circuitry including an oscillator, Phase Locked Loop, and/or Delay Locked Loop), e.g., by using a pulse width modulation technique. A commonly-owned and a co-pending U.S. patent application, Dong Chen et al., "Global Synchronization of parallel processors using clock pulse width modulation," whose U.S. patent application Ser. No. 12/696,764, wholly incorporated herein by reference, describes the pulse width modulation technique in detail.

Referring to FIG. 1, the system clock signal 125, with encoded commands, is delivered to a plurality of processors 160 via a system clock distribution network 150. In one embodiment, this network 150 is passive, i.e. it does not further change the system clock. At the leaf nodes of the clock distribution network 150, clock signals 155, 156, 157 are therefore delayed replicas of the system clock signal (with encoded commands) 125. At step 320 in FIG. 3, upon receiving the encoded command, the plurality of processors 160 adjust power dissipation according to the encoded command, e.g., by using DVS techniques, DFS techniques, performance adjustment techniques (e.g., running fewer instructions, reducing throughput, slowing down the rate of memory accesses, reducing thresholds for clock gating, etc.). For example, in response to the encoded command, actuators 170 in the plurality of processors 160 may decrease a local on-chip clock frequency in the plurality of processors 160 or reduce power supply "$V_{dd}$" in the plurality of processors 160.

Figure 4:
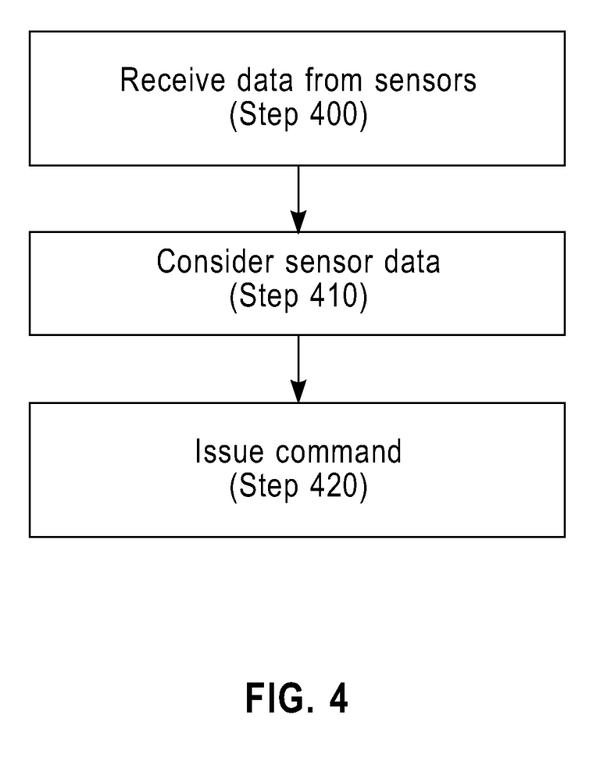
FIG. 4 is a flow chart describing method steps operated by a host computer device in one embodiment.

In one embodiment, the host computing device 180 is tasked with power management of the parallel computing system 100. A commonly-owned and co-pending U.S. patent application, Ralph Bellofatto et al., "Power throttling of collections of computing elements," U.S. patent application Ser. No. 11/768,752, wholly incorporated herein by reference, describes the operation of the host computing device 180 in detail. FIG. 4 is a flow chart that describes method steps operated in the host computing device 180 to issue a command to the parallel computing system 100 in one embodiment. At step 400, the host computing device 180 is programmed to receive or process one or more of inputs including, but not limited to: data center policies 192, the time-varying cost 190 of electricity and/or cooling, and data 195 (e.g. temperature measurements, electricity power measurement, etc.) from sensors 175 installed internally in or externally to the parallel computing system 100. The programming in the host computing system 180 may change from time to time. Data center policies 192 include, but are not limited to: policies that set desirable temperature levels, policies that set aside times for maintenance on all or part of the parallel computer, policies that set job priorities, differentiating between daytime jobs and night time jobs, etc, all of which may influence power management of the parallel computing system 100. At step 410, the host computing device 180 interprets or analyzes these inputs. At step 420, based on the analyses, the host computing device 180 generates commands that are to be delivered to all or some of the processors 160. In one embodiment, the commands from the host computing device 180 are delivered to the clock pulse width modulator 120 via any chain 185 of suitable transmission mediums and protocols, e.g., Ethernet, JTAG, I²C (Inter-Integrated Circuit), etc.

Figure 2:
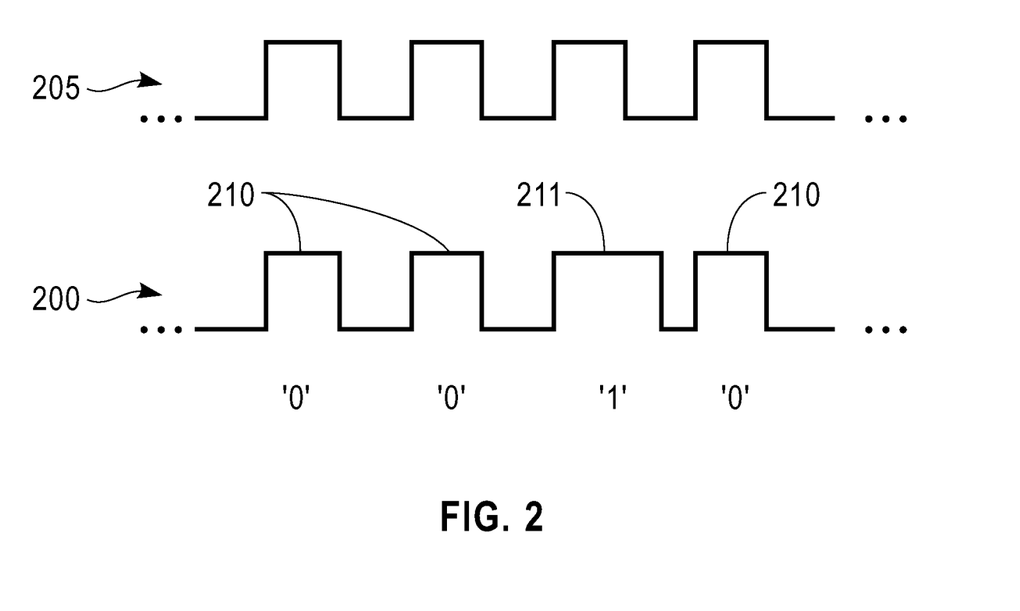
FIG. 2 is a clock signal with a pulse width modulation that carries a serial binary data stream in one embodiment.

In one embodiment, by using pulse width modulation technique described in herein incorporated U.S. patent application Ser. No. 12/696,764, the clock pulse width modulator 120 encodes the commands into the global system clock signal as illustrated in FIG. 2. Upon receiving the original system clock signal 205 (i.e., strictly periodic system clock signal 205) from the system clock source 110 and the command from the host computing device 180, the clock pulse width modulator 120 applies a pulse width modulation operation on the original system clock signal 205 that results in an exemplary system clock signal 200 that encodes the command. The system clock signal 200 encoded with commands has 50% duty cycle pulses (pulses labeled 210) and a widened pulse with 75% duty cycle (pulse labeled 211). In this exemplary system clock signal 200, the widened pulse 211 is obtained by delaying the falling edge by ¼ clock cycle, while maintaining strict periodicity on the rising clock edge. Pulse 210 represents a binary number "0". Pulse 211 represents a binary number "1." The exemplary system clock signal 200 represents the original strictly periodic system clock 205 through unchanged rising edges of exemplary system signal 200 and also represents the commands (e.g., binary code word "0010") by using a varying pulse width of the exemplary system clock signal 200.

Figure 5:
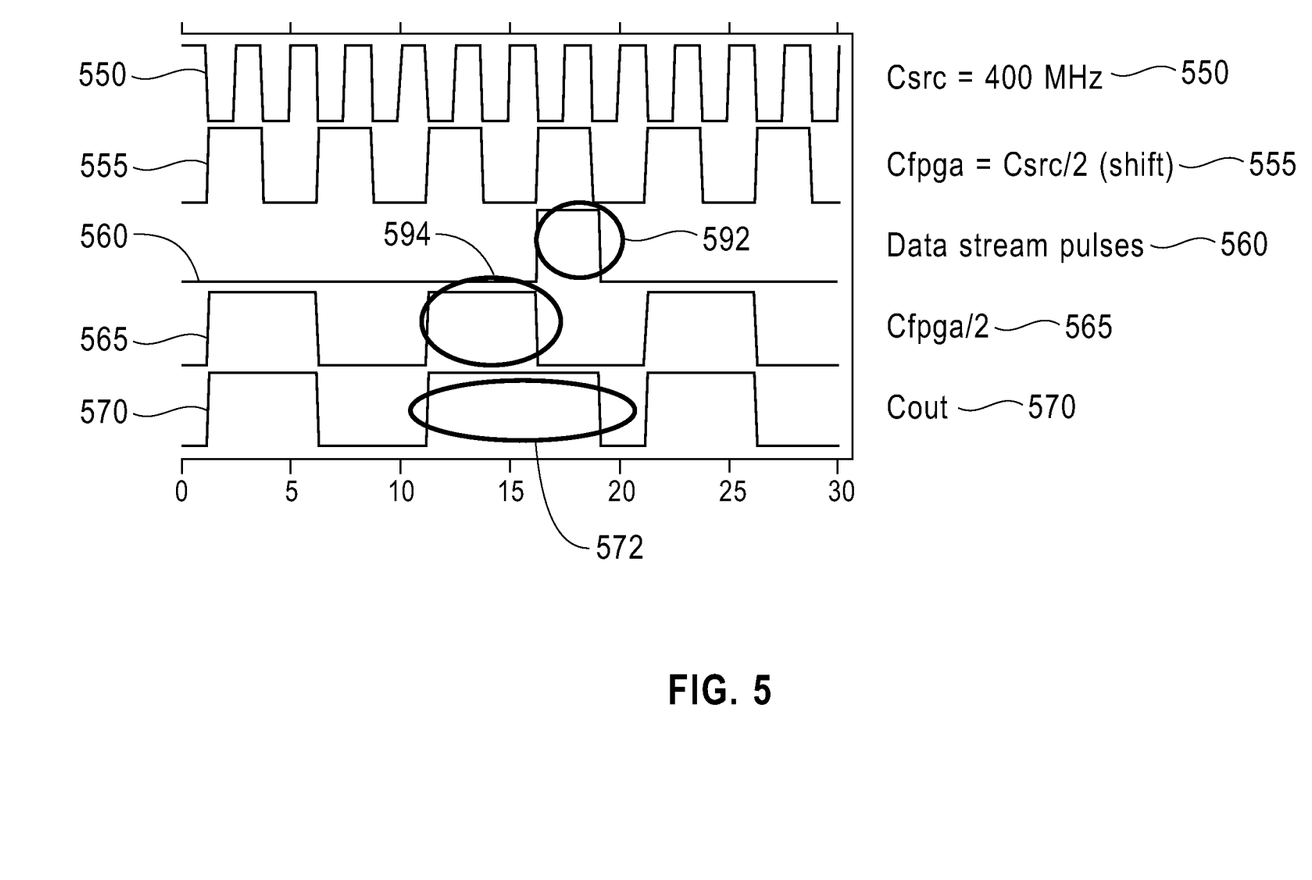
FIG. 5 is an exemplary illustration of a pulse width modification technique in one embodiment.

FIG. 5 illustrates in more detail an example operation of a clock pulse width modulator 120 which widens selected pulses of a system clock signal. In this example, the system clock source 110 receives a 400 MHz first clock signal (550) from a clock synthesizer (not shown) and outputs a 200 MHz second clock signal (555) to the clock pulse width modulator 120, e.g., by dividing the 400 MHz frequency of the first clock signal (550) by two. The clock pulse width modulator 120 generates a data pulse stream (560), in response to a desired binary data encoding containing a '0' or a '1'. The clock pulse width modulator 120 also divides the clock frequency of the 200 MHz second clock signal (555) to generate a 100 MHz third clock signal (565). The data pulse stream shown at (560), also is used to determine which clock periods in the 100 MHz third clock signal (565) are going to be modified. In this example, the data pulse stream (560) includes a pulse at a location (592) corresponding to the second pulse (594) in the 100 MHz third clock signal (565). In other words, the location (592) of this pulse (560) corresponds to the second pulse (594) in the 100 MHz third clock signal (565). Thus, it is determined that the second pulse (594) is to be modified as shown at FIG. 5. Specifically, to widen the second pulse (594) in the 100 MHz third clock signal (565), the clock pulse width modulator 120 may perform a logical OR operation between the 100 MHz third clock signal (565) and the pulse (560) and generates a pulse width modified clock signal (570). In this fashion, any binary data, and specifically the binary representation of a command, can be converted into a serial stream of pulses (560), which can subsequently be encoded onto the 100 MHz third clock signal (565). The resulting modified clock signal (570) is injected by clock pulse width modulator 120 into the clock distribution network 150 via a connection 125 (e.g., an interconnect connecting the clock distribution network and the pulse width modulator 120). The clock distribution network 150 will deliver the modified clock signal (570) to all processors 160.

In an alternative embodiment, the clock pulse modulation 120 transforms the binary data (e.g., binary representation of the command, etc.) using any suitable self-clocking digital encoding technique that has been developed for serial communication channels. These suitable self-clocking digital encoding techniques (also known as "line codes") include, but are not limited to: Manchester encoding, Differential Manchester encoding, Biphase mark encoding, MLT-3 encoding, etc.

In one embodiment, the processors may be able to decode binary data encoded in a pulse width modulated system clock signal, e.g., by sampling that system clock signal at 8 or 16 times faster than the frequency of the system clock signal. By utilizing a recovery circuitry (e.g., a series of D flip-flops as described in herein incorporated U.S. patent application Ser. No. 12/696,764) that performs the sampling, the processors 160 completely recover the binary data (e.g., "0010" in FIG. 2). The recovered binary data represents the original commands or data issued by host computer 180.

In one embodiment, the actuators 170 in the processors 160 may employ a mapping table (not shown) that indicates which action (e.g., DVS technique, DFS technique, etc.) the processors 160 need to take per each command. Upon decoding the command, the processors 160 may react according to an action(s) described in the mapping table.

In one embodiment, the clock pulse width modulation and other digital modulation techniques (e.g., Manchester encoding, etc.) can be made fully compatible with the global synchronization technique described in herein incorporated U.S. patent application Ser. No. 12/696,764, if the binary data to be encoded in the system clock signal include a unique binary sequence (symbol) that is transmitted at a regular interval to the processors 160. This regularly transmitted symbol will be interpreted by the processors 160 as a global synchronization command (i.e., a command for synchronizing the processors according to a single system clock signal). For example, if, as in serial communication protocols (e.g., RS-232 protocol, etc.), code word boundaries in binary data are demarcated with start and stop symbols, then the start symbol of each binary code word may serve as the global synchronization symbol.

As described in herein incorporated U.S. patent application Ser. No. 12/696,764, the global synchronization of processors 160 allows deterministic timing operations (i.e., synchronization) of these processors. While the processors 160 may not be exactly synchronized due to path delay differences ("skew") in the clock distribution network (e.g., the paths 155, 156, 157 in FIG. 1 may have different delays), these delay differences will be deterministic and can be accounted for. Thus, the advantage of combining global synchronization commands with power management commands, all encoded on the same system clock, and distributed on the same system clock distribution network, is that the processors 160 are also able to react to the power management commands with deterministic timing. In other words, by encoding commands onto the system clock signal, the parallel computing system 100 maintains synchronicity (modulo deterministic timing offsets) between all processors 160 responding to the commands. Thereby, the parallel computing system 100 can enable synchronized (or orchestrated) power management actions that include, but are not limited to: frequency step-downs and subsequent voltage step downs, an operation for saving power dissipation in the parallel computing system, re-enabling DFS and/or DVS techniques which are globally synchronized in the parallel computing system. Such a deterministic timing scheme (e.g., a globally synchronized action for saving power dissipation in the parallel computing system 100) allows maintaining the integrity of chip-to-chip communication in the parallel computing system 100, which is dependent on maintaining the timing relationships between the communicating processors 160, even if the power management actions result in frequency changes of on-chip clocks governing (sub-circuits of) processors 160.

In one embodiment, to compensate for long-term timing drift in the clock distribution network 150, e.g., due to the variations in temperature, the timing offsets between processors 160 periodically need to be recalibrated, e.g., by determining the timing of specific message exchanges between communicating processors 160 with respect to the receipt of the global synchronization command.

Upon receipt of a power management command (e.g., binary data encoded in the system clock signal for globally and synchronously running DFS and/or DVS techniques in the processors 160), the actions of the processors 160 include, but are not limited to: configuring the processors 160 to adjust an operating frequency of appropriate sub circuitry in concert by utilizing the DFS technique, configuring the processors 160 to adjust an operating power supply voltage by utilizing the DVS technique, and resuming of frequency-synchronized processor-to-processor communication among the processors 160 with a minimal disruption, etc.

In one embodiment, the commands (e.g., binary sequence, binary data etc.) from the host computer device 180 to the processors 160 can incorporate addressing schemes to allow differentiation between processors, or groups of processors. For example, the addressing scheme can include a broadcast scheme (i.e., a simultaneous delivery of the same commands to all processors 160), a multicast addressing scheme (i.e., a simultaneous delivery of commands to a pre-determined subgroup of computers or processors), or an individual addressing scheme (i.e., a single delivery of the commands to a single processor), or any combination thereof.

In one embodiment, each processor 160 is programmed to respond to all of: (a) broadcast commands; (b) commands that include its individual address; or (c) commands that include one of the group addresses to which the processor has previously been subscribed. This allows each processor in a given partition to act on any specific command from the host computing device 180, that include its group address (or one of its group addresses), while each processor will ignore commands that have a group address that it does not recognize. Thus, each desired subset (partition) of the parallel computing system (e.g., a partition 105, partition 135, etc.) is defined as the set of processors that responds to a different group address. Employing this grouping or multicast scheme, each partition of the parallel computing system may perform different actions to adjust its power dissipation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An apparatus for automatically controlling power dissipation in a parallel computing system that includes a plurality of processors, the apparatus comprising:
    a computing device issuing a command signal, which represents a command, to the parallel computing system;
    a clock pulse-width modulator receiving the command signal and a system clock signal, encoding the command, represented in the command signal, into the system clock signal to be distributed to the plurality of processors, the encoding including:
        performing a logical OR operation between the command signal and the system clock signal and outputting a modified clock signal, the modified clock signal having one or more modified pulses wherein a modified pulse in the modified clock signal has a rising edge aligned with a rising edge of a corresponding pulse of the system clock signal but a width of the modified pulse being different from the corresponding pulse width of the system clock signal, the one or more modified pulses representing the command; and
    the plurality of processors in the parallel computing system receiving the modified clock signal including the encoded command and adjusting power dissipation at one or more of the plurality of processors according to the encoded command.

2. The apparatus according to claim 1, wherein the one or more of the plurality of processors synchronously respond to the encoded command.

3. The apparatus according to claim 1, wherein the clock pulse-width modulator encodes the command in the system clock signal by using a pulse width modulation.

4. The apparatus according to claim 1, where the command includes a periodic global synchronization signal for synchronizing the one or more of the plurality of processors.

5. The apparatus according to claim 1, wherein the command initiates a power management action of the parallel computing system.

6. The apparatus according to claim 1, wherein in response to the encoded command, the one or more of the plurality of processors adjust power dissipation by using one or more of: clock gating, dynamic frequency scaling (DFS), dynamic voltage scaling (DVS), and performance adjustment.

7. The apparatus according to claim 1, wherein the computing device issues the command in response to data from sensors internal to the parallel computing system.

8. The apparatus according to claim 1, wherein the computing device issues the command in response to data from sensors external to the parallel computing system.

9. The apparatus according to claim 1, wherein the computing device issues the command in response to data center policies.

10. The apparatus according to claim 1, wherein the computing device issues the command in response to time varying cost of electricity and cooling of the parallel computing system.

11. The apparatus according to claim 1, wherein each partition of the parallel computing system reacts differently in response to the encoded command.

12. A method for automatically controlling power dissipation in a parallel computing system that includes a plurality of processors, the method comprising:
  issuing, at a computing device, a command signal, which represents a command, to the parallel computing system;
  receiving, at a clock pulse-width modulator, the command signal and a system clock signal;
    encoding, at the clock pulse-width modulator, the command, represented in the command signal, into the system clock signal to be distributed to the plurality of processors, the encoding including:
      performing a logical OR operation between the command signal and the system clock signal and outputting a modified clock signal, the modified clock signal having one or more modified pulses wherein a modified pulse in the modified clock signal has a rising edge aligned with a rising edge of a corresponding pulse of the system clock signal but a width of the modified pulse being different from the corresponding pulse width of the system clock signal, the one or more modified pulses representing the command; and
  receiving, at the plurality of processors in the parallel computing system, the modified clock signal including the encoded command and adjusting, at one or more of the plurality of processors, power dissipation according to the encoded command.

13. The method according to claim 12, wherein the one or more of the plurality of processors synchronously respond to the encoded command.

14. The method according to claim 12, wherein the encoding the command in the system clock signal includes:
  using a pulse width modulation.

15. The method according to claim 12, where the command includes a periodic global synchronization signal for synchronizing the one or more of the plurality of processors.

16. The method according to claim 12, wherein the command initiates a power management action of the parallel computing system.

17. The method according to claim 12, wherein in response to the encoded command, the one or more of the plurality of processors adjust power dissipation by using one or more of: clock gating, dynamic frequency scaling (DFS), dynamic voltage scaling (DVS), and performance adjustment.

18. The method according to claim 12, wherein the computing device issues the command in response to data from sensors internal to the parallel computing system.

19. The method according to claim 12, wherein the computing device issues the command in response to data from sensors external to the parallel computing system.

20. The method according to claim 12, wherein the computing device issues the command in response to data center policies.

21. The method according to claim 12, wherein the computing device issues the command in response to time varying cost of electricity and cooling of the parallel computing system.

22. The method according to claim 12, wherein each partition of the parallel computing system reacts differently in response to the encoded command.

23. A computer program product for automatically controlling power dissipation in a parallel computing system that includes a plurality of processors, the computer program product comprising a storage medium readable by a processing circuit and storing instructions run by the processing circuit for performing a method, the method comprising:
  issuing, at a computing device, a command signal, which represents a command, to the parallel computing system;
  receiving, at a clock pulse-width modulator, the command signal and a system clock signal;
    encoding, at the clock pulse-width modulator, the command, represented in the command signal, into the system clock signal to be distributed to the plurality of processors, the encoding including:
      performing a logical OR operation between the command signal and the system clock signal and outputting a modified clock signal, the modified clock signal having one or more modified pulses wherein a modified pulse in the modified clock signal has a rising edge aligned with a rising edge of a corresponding pulses of the system clock signal but a width of the modified pulse being different from the corresponding pulse width of the system clock signal, the one or more modified pulses representing the command; and
  receiving, at the plurality of processors in the parallel computing system, the modified clock signal including the encoded command and adjusting, at one or more of the plurality of processors, power dissipation according to the encoded command.

24. The computer program product according to claim 23, wherein the one or more of the plurality of processors synchronously respond to the encoded command.

25. The computer program product according to claim 23, wherein the clock pulse-width modulator encodes the command in the system clock signal by using a pulse width modulation.

26. The apparatus according to claim 1, wherein the clock pulse-width modulator divides a frequency of the system clock signal.

27. The method according to claim 12, further comprising:
  dividing, by the clock pulse-width modulator, a frequency of the system clock signal.

* * * * *